United States Patent [19]

Ulrich et al.

[11] Patent Number: 4,743,298

[45] Date of Patent: May 10, 1988

[54] PROCESS AND APPARATUS FOR SEPARATING MERCURY AND RED PHOSPHORUS FROM ONE ANOTHER

[75] Inventors: Hannsjörg Ulrich, Erftstadt; Achim Gassen, Hürth, both of Fed. Rep. of Germany

[73] Assignee: Hoechst Aktiengesellschaft, Fed. Rep. of Germany

[21] Appl. No.: 921,757

[22] Filed: Oct. 22, 1986

[30] Foreign Application Priority Data

Nov. 5, 1985 [DE] Fed. Rep. of Germany ....... 3539163

[51] Int. Cl.⁴ .............................................. C22B 3/00
[52] U.S. Cl. ................................... 75/121; 75/97 R; 422/243; 423/99
[58] Field of Search ................. 75/121, 97 R; 423/99

[56] References Cited

U.S. PATENT DOCUMENTS 4,392,962 7/1983 Lehr et al. ...................... 75/121 X

*Primary Examiner*—Patrick P. Garvin
*Attorney, Agent, or Firm*—Connolly and Hutz

[57] ABSTRACT

A mixture of mercury and red phosphorus obtained by flowing an aqueous solution having at least one mercury salt dissolved in it through a layer of granular red phosphorus in a column arranged in upright position and provided, close to its lower end, with means supporting the layer of red phosphorus, is separated into its constituents. To this end, fluidizing matter is forced from below under pressure over a period of 5–30 minutes through the said means and layer of red phosphorus thereon, the mercury/red phosphorus-mixture covered with solution and provided with flow deflecting paths becoming lifted up; mercury dropping from the mixture so lifted is collected over a period of 5–30 minutes on the supporting means; fluidizing matter is forced from above under pressure over a period of 1–20 seconds into contact with the said mixture; and the mercury running down from the supporting means is collected. Apparatus for carrying out the process.

3 Claims, 1 Drawing Sheet

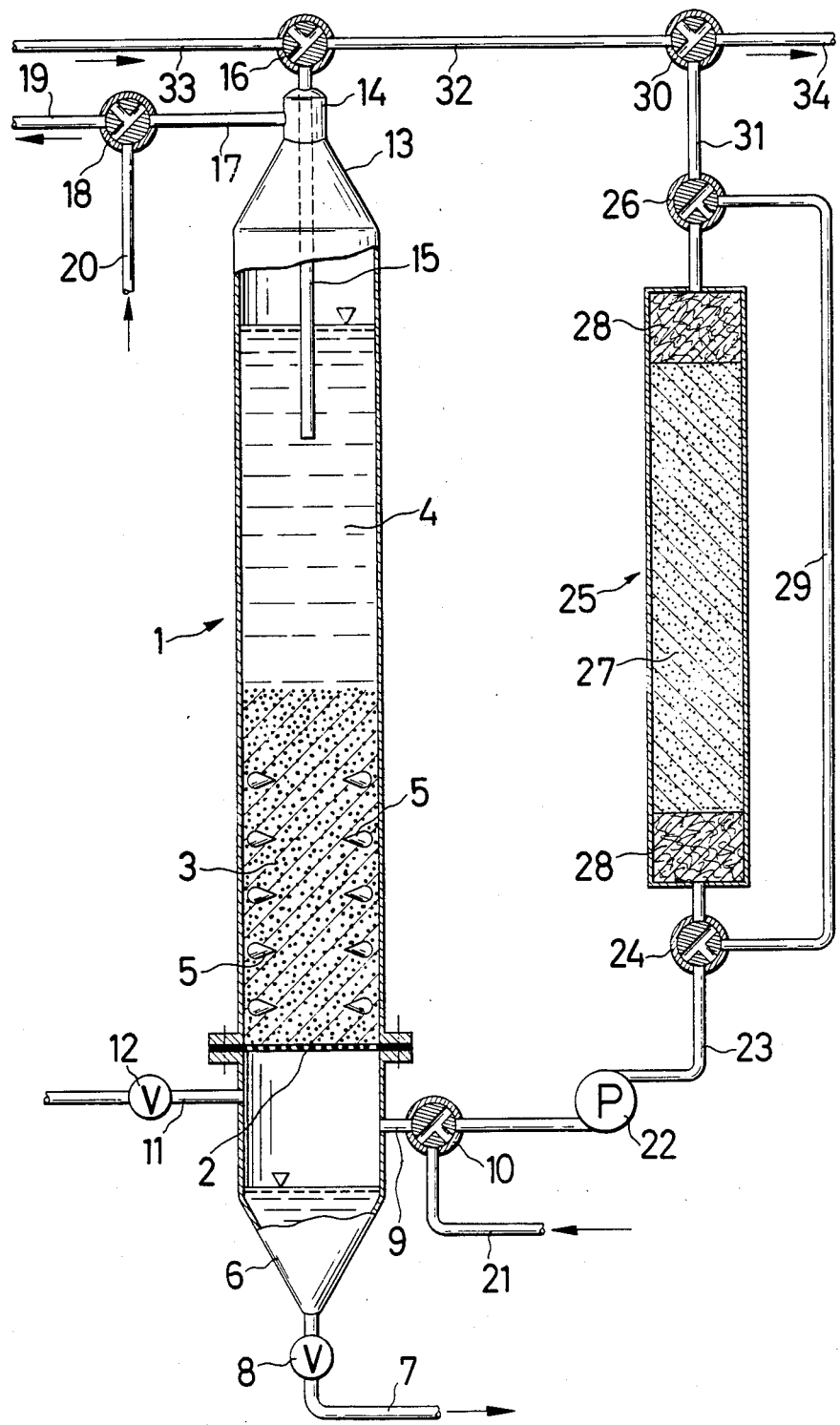

PROCESS AND APPARATUS FOR SEPARATING MERCURY AND RED PHOSPHORUS FROM ONE ANOTHER

This invention relates to a process for separating a mixture of mercury and red phosphorus into its constituents, the mixture having been obtained by flowing an aqueous solution having at least one mercury salt dissolved in it through a layer of granular red phosphorus in a column arranged in upright position and provided, close to its lower end, with means supporting the layer of red phosphorus; the invention also relates to an apparatus for carrying out the process.

European Patent Specification No. 52 253 describes a process for separating inter alia seminoble metals, e.g. mercury, from the aqueous solutions of their salts, wherein the aqueous solutions are conveyed through a zone containing a layer of red phosphorus particles with a size of up to 10 mm. Although this process permits mercury to be separated from very dilute solutions and to be concentrated in metal form the fact remains that the separation of a mixture of mercury and red phosphorus continues to remain a problem.

Heretofore, it has been attempted to separate mercury/red phosphorus-mixtures by distilling them under vacuum. This treatment calls for the use of expensive distilling means and has the disadvantage associated with it that the partial conversion of the red to yellow phosphorus affects the separation targeted.

It is therefore desirable to have a process for separating a mercury/red phosphorus-mixture into its constituents and an apparatus for carrying out the process permitting the mixture undergoing separation to be retained in the column used for separating the mercury from the aqueous solutions of its salts, and permitting the red phosphorus so freed from mercury to be used again for separating mercury from the aqueous solutions of its salts.

To this end, the invention provides for fluidizing matter to be forced from below under pressure over a period of 5–30 minutes through the supporting means and layer of red phosphorus thereon, the mercury/red phosphorus mixture covered with solution and provided with flow deflecting paths becoming lifted up; for the mercury dropping from the mixture so lifted to be collected, over a period of 4–30 minutes on the supporting means; for fluidizing matter to be forced from above under pressure over a period of 1–20 seconds into contact with the mixture aforesaid; and for the mercury running down from the supporting means to be ultimately collected.

Further preferred and optional features of the invention provide:

(a) for the fluidizing matter to be forced from below through the supporting means under a pressure of 1.05–1.5 bars;
(b) for the fluidizing matter to be forced from above into contact with the layer on the supporting means under a pressure of 1.05–2.0 bars;
(c) for the fluidizing matter to be a non reactive gas;
(d) for the fluidizing matter to be water;
(e) for the fluidizing matter to be an aqueous solution at least partially freed from mercury.

An apparatus for carrying out the present process comprises e.g. a column in upright position provided, close to its lower end, with a horizontally disposed plate having perforations 25–100 μm wide supporting said mixture and, within the region of said mixture, with flow-deflecting means; a liquid outlet being passed through the column at a level below the perforated plate and connected to a pump rotatable in two directions; a first conduit running from the pump into the lower end of a tubular structure being arranged in upright position and filled with active carbon; a second conduit and a third conduit connecting a liquid inlet to the tubular structure; the column having a conically tapered end receiving a head having the liquid inlet passed through it, and a mercury collecting tank sealed to its lower end.

Further preferred and optional features of the apparatus of this invention provide;

(f) for the supporting plate to have a filter cloth with a pore width corresponding approximately to the width of the perforations in the plate spanned over it;
(g) for the flow-deflecting means to comprise a plurality of flow-breakers secured to the inside of the column;
(h) for the flow-deflecting means to comprise packing material placed in the mixture;
(i) for a tubular inlet for the supply of compressed gas to be arranged so as to open laterally into the column head, the tubular inlet being flow-connected by means of a third three-way cock to a first gas supply tube and to a second pressure releasing tube;
(j) for the column to have the first pressure-releasing tube provided with a second locking valve passed through it, at a level below the perforated plate;
(k) for the liquid outlet to have a first three-way cock connected to a second gas supply tube installed in it;
(l) for the lower end of the tubular structure to be connected to a fourth three-way cock and for the upper end of the tubular structure to be connected to a fifth three-way cock, and for each of the said three-way cocks to be connected to a bypass.

The process of this invention provides for nitrogen, carbon dioxide and optionally air and mixtures thereof to be used as the non reactive gas. It also provides for mixtures of water and aqueous solutions and non reactive gas mixtures to be used as fluidizing matter.

The mercury obtained in the process of this invention is substantially pure and the red phosphorus retained in the column can directly be used again for separating mercury from an aqueous solution of its salts.

An apparatus for carrying out the process of this invention is shown diagrammatically, partially in section, in the accompanying drawing.

With reference to the drawing:

A column 1 is provided, close to its lower end, with a perforated plate 2 which should preferably have a filter cloth with a pore width substantially corresponding to the width of the perforations of the plate, spanned over it. The plate 2 provides support for a layer 3 of red phosphorus; the space above layer 3 in column 1 is filled with a solution 4 containing mercury. A plurality of flow breakers 5 spaced apart from, and one downstream of, another is secured, within the region of the layer 3, to the inside wall of column 1; they serve as flow-deflecting means and three such flow breakers should conveniently be arranged horizontally, level with each other. Fixed to the lower end of column 1 is a conically shaped mercury collector 6 which is formed with an outlet 7 having a first locking valve 8 installed in it. Column 1 has passed through it, in its lower portion below the perforated plate 2, a liquid outlet 9 connected to a first three-way cock 10, and also a first pressure-releasing tube 11 connected to a second locking valve 12.

Column 1 is formed with a conically shaped upper end portion 13 terminating in a head 14 which has a liquid inlet 15 connected to a second three-way cock passed through it. A compression gas supply tube 17 connected to a third three-way cock which in turn is connected to a second pressure-releasing tube 19 and a first gas supply tube 20 is arranged to open into head 14.

The first three-way cock 10 is also connected to a second gas supply tube 21 and a second pump 22 reversible in the direction of flow. The pump 22 has a first conduit 23 leading to a fourth three-way cock 24 connected to it. A tube 25 connected to the fourth three-way cock 24 and a fifth three-way cock 26 is filled with a layer 27 of active carbon, a wad 28 being placed below and above the active carbon layer 27. The fourth three-way cock 24 and fifth three-way cock 26 are ultimately connected to a bypass 29.

The fifth three-way cock 26 and a sixth three-way cock 30 are interconnected by a second conduit 31, the sixth three-way cock 30 being also connected by means of a third conduit 32 to the second three-way cock 16.

The second three-way cock 16 is finally provided with an inlet 33 for admitting mercury-containing solution and the sixth three-way cock 30 is formed with an outlet 34.

The following Examples illustrate the separation in accordance with this invention of a mixture of mercury and red phosphorus into its constituents.

EXAMPLE 1 (INVENTION)

A column 1 such as that shown in the accompanying drawing (diameter=50 mm, height=800 mm; provided with altogether 15 flow breakers 5, of which in each case three level with one another, spaced apart at 45 mm intervals) was filled with a quantity of granular red phosphorous (particle size=250–500 μm) necessary for the uppermost level of the flow breakers 5 to lie approximately 5 cm below the upper phosphorus level.

Next, an aqueous $HgCl_2$-solution was admitted through inlet 33, second three-way cock 16 and liquid inlet 15 and passed through column 1 until the layer 3 of red phosphorus contained 50.4 g mercury, of which small droplets had coagulated at various places. By means of the second gas supply tube 21 and first three-way cock 10 nitrogen was forced from below under a pressure of 1.35 bars through the layer 3 of red phosphorus superficially covered with an about 4 cm thick liquid layer. The entire layer 3 in column 1 became lifted up at a rate of about 1–2 cm; as a result, the layer 3 came into contact with the flow breakers 5 and was repeatedly torn apart at a rate increasing from below to above. Elemental mercury was found to form at once at the torn places; the high specific density made the mercury deposit after about 15 minutes on the upper side of perforated plate 2. The supply of nitrogen was arrested and smallest mercury beads were found to drop through perforated plate 2 into mercury collector 6. Next, nitrogen was forced under a pressure of 1.6 bars through first gas supply tube 20, compression gas supply tube 17 and liquid inlet 15 on to the upper side of layer 3, and mercury still retained on the perforated plate 2 was forced into mercury collector 6; introducing the nitrogen over a period of 5 seconds was necessary to achieve this.

The mercury collector 6 was ultimately found to contain 43.2 g mercury, i.e. 67.8% of the quantity of mercury deposited on the red phosphorus layer 3.

EXAMPLE 2 (INVENTION)

The apparatus was the same as that used in Example 1.

90.8 g mercury was on the red phosphorus layer 3.

The solution 4 in column 1 was forced from below via liquid inlet 15, third conduit 32, second conduit 31, tube 25, first conduit 23, pump 22 and liquid outlet 9 through perforated plate 2, a cushion of air being initially forced to flow through the red phosphorus. The entire layer 3 became lifted up, torn apart at various places and elemental mercury formed instantaneously at the torn places. Next, the solution was circulated for a further 15 minutes through bypass 29 to provide release for tube 25 filled with active carbon. During that time, the phosphorus remained slightly suspended but mercury deposited on perforated plate 2. The solution was then circulated in opposite direction by reversing pump 22 and mercury was found to drop practically instantaneously through perforated plate 2 into mercury collector 6. The latter was found to contain 67.8 g mercury, i.e. 74.7% of the mercury quantity deposited on red phosphorus layer 3.

EXAMPLE 3 (INVENTION)

Example 2 was repeated but compressed air was forced from above under a pressure of 1.2 bar on to layer 3 of red phosphorus, the gas replacing the circulated solution.

Mercury collector 6 was found to contain 67.5 g mercury, i.e. 74.3% of the mercury quantity deposited on layer 3.

EXAMPLE 4 (INVENTION)

Example 2 was repeated but nitrogen was forced from below, through the red phosphorus layer, altogether three times, under a pressure of 1.2 bar over a period of 8 seconds into the circulated solution, and the direction of flow of the solution was reversed already after 10 minutes.

82.0 g mercury was initially deposited on the phosphorus layer 3, of which 65.1 g, i.e. 79.5% was recovered in mercury collector 6.

EXAMPLE 5 (INVENTION)

The apparatus was the same as that used in Example 1 but column 1 was free from flow breakers 5 and a mixture of red phosphorus and glass rings (5 mm wide) in a volume ratio of 2:1 was used as the layer 3. 100 g mercury was on the mixture.

The experiment was carried out as described in Example 2. Mercury collector 6 was ultimately found to contain 66 g mercury.

EXAMPLE 6 (COMPARATIVE EXAMPLE)

Example 5 was repeated but the layer 3 was red phosphorus without glass rings and the solution was circulated from below through the red phosphorus over a period of 45 minutes. 85.6 g mercury was on layer 3.

Mercury collector 6 was ultimately found to contain 25.5 g mercury, i.e. 29.8% of the mercury deposited on red phosphorus layer 3.

We claim:

1. A process for separating a mixture of mercury and red phosphorus into its constituents, the mixture being obtained by flowing an aqueous solution having at least one mercury salt dissolved in it through a layer of granular red phosphorus in a column arranged in upright position and provided, close to its lower end, with means supporting the layer of red phosphorus, which comprises: forcing a non reactive gas selected from the group consisting of nitrogen, carbon dioxide, air and mixtures thereof from below under a pressure of 1.05 to 1.5 bars over a period of 5 to 30 minutes through said means and layer of red phosphorus thereon, the mercury/red phosphorus-mixture covered with solution and provided with flow deflecting paths becoming lifted up; collecting, over a period of 5 to 30 minutes on the supporting means, the mercury dropping from the mixture so lifted ; forcing the non reactive gas from above under a pressure of 1.05 to 2.0 bars over a period of 1 to 20 seconds into contact with said mixture; and ultimately collecting the mercury running down from the supporting means.

2. A process for separating a mixture of mercury and red phosphorus into its constituents, the mixture being obtained by flowing an aqueous solution having at least one mercury salt dissolved in it through a layer of granular red phosphorus in a column arranged in upright position and provided, close to its lower end, with means supporting the layer of red phosphorus, which comprises: forcing water from below under a pressure of 1.05 to 1.5 bars over a period of 5 to 30 minutes through said means and layer of red phosphorus thereon, the mercury/red phosphorus-mixture covered with solution and provided with flow deflecting paths becoming lifted up; collecting, over a period of 5 to 30 minutes on the supporting means, the mercury dropping from the mixture so lifted; forcing water from above under a pressure of 1.05 to 2.0 bars over a period of 1 to 20 seconds into contact with said mixture; and ultimately collecting the mercury running down from the supporting means.

3. A process for separating a mixture of mercury and red phosphorus into its constituents, the mixture being obtained by flowing an aqueous solution having at least one mercury salt dissolved in it through a layer of granular red phosphorus in a column arranged in upright position and provided, close to its lower end, with means supporting the layer of red phosphorus, which comprises: forcing an aqueous solution at least partially freed from mercury from below under a pressure of 1.05 to 1.5 bars over a period of 5 to 30 minutes through said means and layer of red phosphorus thereon, the mercury/red phosphorus-mixture covered with solution and provided with flow deflecting paths becoming lifted up; collecting, over a period of 5 to 30 minutes on the supporting means, the mercury dropping from the mixture so lifted; forcing said aqueous solution at least partially freed from mercury from above under a pressure of 1.05 to 2.0 bars over a period of 1 to 20 seconds into contact with said mixture; and ultimately collecting the mercury running down from the supporting means.

* * * * *